Aug. 15, 1961  J. CZAJA  2,996,156
INERTIA FRICTION BRAKE
Filed June 5, 1959  2 Sheets-Sheet 1
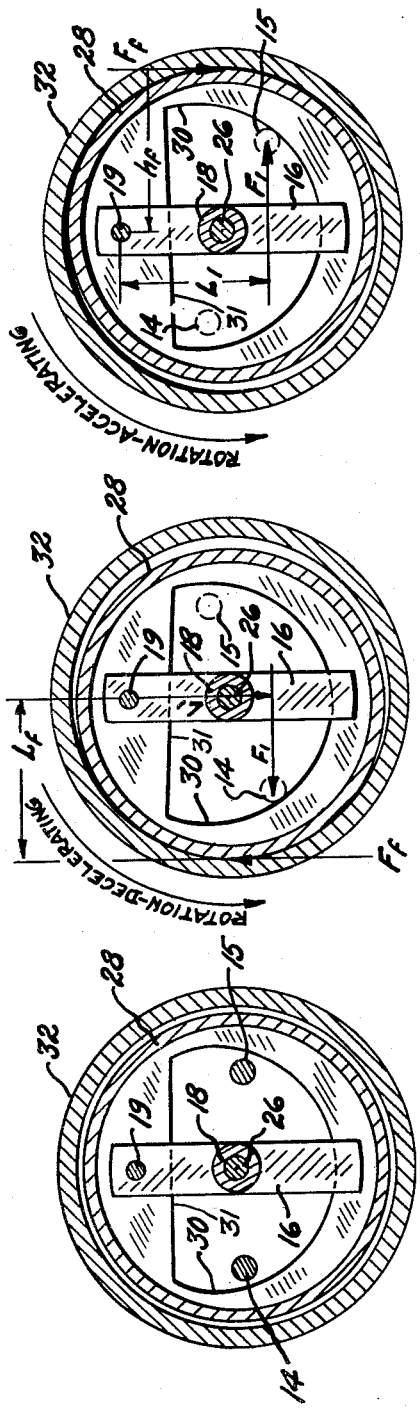
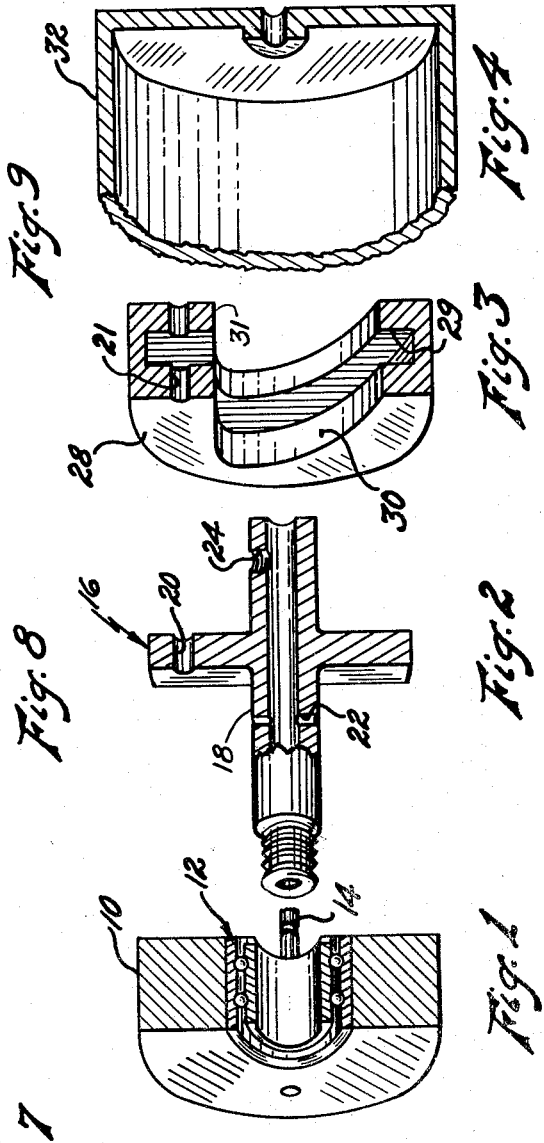
INVENTOR.
JULIUS CZAJA
BY
Arnold H. Cole
ATTORNEYS

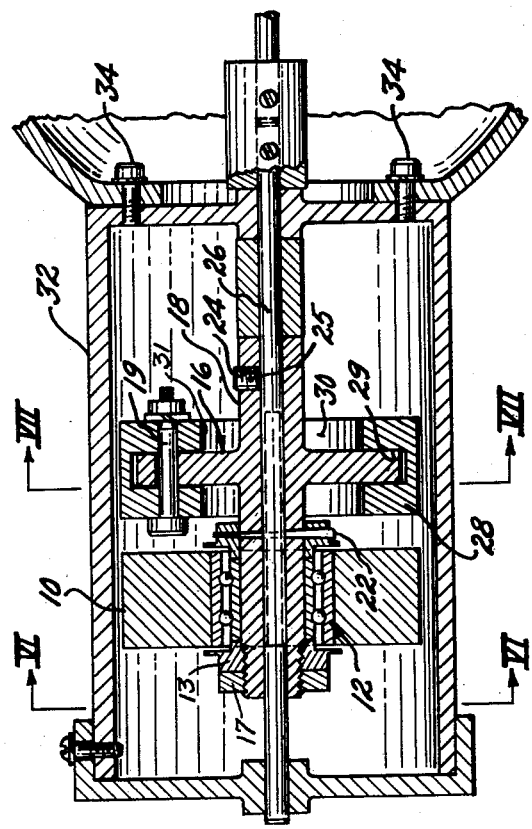
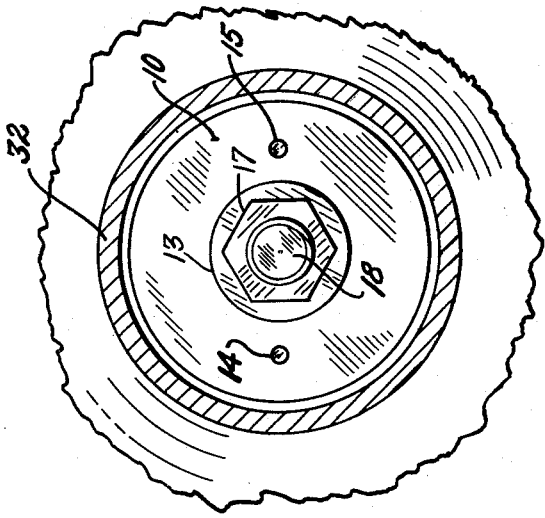

United States Patent Office 2,996,156
Patented Aug. 15, 1961

2,996,156
INERTIA FRICTION BRAKE
Julius Czaja, Syracuse, N.Y., assignor to the United States of America as represented by the Secretary of the Air Force
Filed June 5, 1959, Ser. No. 818,494
2 Claims. (Cl. 188—135)

This invention relates to a self-energizing brake actuated by a flywheel and is suitable for shortening the period of coast of rotating machinery after the motive power has been cut off.

Among the objects of this invention is the provision of a device which is self-actuating, will operate in either direction of rotation equally well, will operate as a self-energizing brake only on deceleration and will disengage should power be supplied before a complete stop has been made.

Briefly the invention consists of a flywheel rotating at the speed of the shaft it is to control but free to continue movement by inertia on a low friction bearing when the shaft slows down. A pin on the flywheel engages an eccentric cam which is forced against a brake drum to further slow rotation until rotation ceases or the shaft is again accelerated.

The above and still other objects, advantages and features of my invention will become apparent upon consideration of the following detailed description of one embodiment thereof, especially when taken in conjunction with the accompanying drawings, in which:

FIG. 1 is a sectional third dimensional view of the flywheel;

FIG. 2 is a sectional third dimensional view of the hub which is pinned to the drive shaft;

FIG. 3 is a sectional third dimensional view of the friction disc;

FIG. 4 is a sectional third dimensional view of the brake drum;

FIG. 5 is a sectional view of the invention with some of the parts removed;

FIG. 6 is a sectional end view taken through line VI—VI of FIG. 5;

FIG. 7 is a view showing the relative positions of the parts at rest taken through line VII—VII of FIG. 5;

FIG. 8 is a view showing the relative positions of the parts when the drive shaft is revolving counter clockwise and decelerating; and FIG. 9 is a view showing the relative positions of the parts when the drive shaft is accelerating in a counter clockwise direction.

In the drawings the numeral 10 designates a flywheel. Said flywheel rotates on a low friction ball bearing 12 and is fitted with a pair of oppositely disposed pins 14 and 15. A carrying means including a hub 16 is provided with a hollow shaft 18 to receive a drive shaft 26. Said hollow shaft 18 is drilled and tapped at 24 to receive a set screw which will fasten it to said drive shaft. At 20, the said hub is drilled to receive a pin 19. The hub 16 is also drilled at 22 to receive a second pin. This latter pin serves as a stop for said ball bearing 12. A friction disc 28 is drilled at 21 and the pin 19 passes through 20 and 21 and members 16 and 28 are thereby assembled. The friction disc 28 is formed with a circular outer surface. The inner portion thereof, 30, is cut away as best seen in FIG. 3. The cut away surface, 31, adjacent the drilled hole 21 is flat. The lower section of said cut away portion, 30, is in the form of a symmetrical cam surface between the outer edges of said flat section. Completely around the surface of said cut away portion, the disc 28 is formed with a slot 29. The hub 16 fits within said slot 29.

In assembling the unit the hub 16 is placed within the slot 29 and the pin 19 is inserted through the holes 20 and 21. The bearing 12, and the flywheel mounted thereon are fitted over the hollow shaft 18 and a pin is placed in the hole 22 to serve as a stop for said bearing and flywheel. The outer end of said shaft 18 is threaded to receive lock nuts 13 and 17 whereby said bearing and flywheel are held in position between said last-named pin and said lock nuts. A drive shaft 26 is inserted into the hollow shaft 18 and is fixed to the hub 16 by means of a set screw 25. Either the pin 14 or 15 on the flywheel will come into contact with the cut away portion of the disc 28, depending on whether the drive shaft 26 is accelerated or decelerated. A cylindrical drum 32 serves to enclose the entire assembly and a plurality of bolts 34 may be employed to secure said drum to any mechanism with which it is to be associated.

In operation, assume drive shaft 26 to be rotated in a counter clockwise direction. The driving power to said shaft is then cut off and the latter will decelerate at a given rate. The disc 28 being connected to said drive shaft through members 18, 25, 16 and 19, will decelerate at the same rate. However, since the flywheel 10 is mounted on the low friction bearing 12, it will decelerate at a slower rate. This variation in the rates of deceleration results in relative motion between said flywheel and the disc 28. Accordingly, the pins on said flywheel will advance to the dotted line positioning shown in FIG. 8. At this point the pin 14 comes in contact with the cam surface of the disc 28, said surface being indicated by the reference character 30. Said disc will thus be forced to pivot about pin 19 and the outer cylindrical surface thereof will contact the inner surface of the drum 32. Sufficient clearance is provided between the base of slot 29 and the hub 16 to permit such pivotal motion on the part of the disc 28. The frictional force due to the engagement of said disc and drum 32 will serve to decelerate the drive shaft 26. This frictional force has a regenerating action on itself. Refer to FIG. 8. The inertia of the flywheel 10 through pin 14 produces a force $F_1$ at a lever arm $L_1$ about pin 19 which moves disc 28 into contact with drum 32. This produces a frictional force $F_f$. This frictional force is acting at a lever arm $L_f$ about pin 19. The turning moment of force $F_f$ acting on disc 28 produces a self-energizing braking action where the frictional force causes itself to become increasingly larger feeding itself. This growing friction force is added to the flywheel force which holds the brake disc 28 in against the drum 32. The above described action of this unit is in the nature of a self-energized brake since stored energy of the flywheel will continue to act through the pin 14 and the cam surface 30 until the drive shaft has completely stopped. It should be obvious from the above description and the symmetrical arrangement of the pins 14 and 15 on the flywheel 10 that this self-energizing braking action will take place regardless of the direction in which the shaft 26 is rotating when energized.

Assuming a condition where it is desired to energize the drive shaft after it has come to a complete stop, the action of the flywheel and the disc are best seen in FIG. 9. If said shaft is started in a counter clockwise direction relative motion will develop between the disc 28 and the flywheel 10. Due to the low friction bearing 12 acceleration of said flywheel will be slower than that of the disc 28. Accordingly the pin 15 will move into contact with the other side of the cam surface 30 on the said disc, as shown in the dotted line of FIG. 9. This action produces force $F_1$ (FIG. 9) acting as a lever arm $L_1$ about pin 19 which in turn causes the disc to move into contact with the wall of the drum. This contact produces a friction force $F_f$ at a lever arm $L_f$ about pin 19. The turning moment of the friction force is opposite in direction to the turning moment of flywheel action. This de-energizing action of the brake disc tends to bring the flywheel quickly up to speed with a minimum drag of the brake shoe against the drum. This permits acceleration almost as quickly with this brake mechanism as without it. The action described immediately above will also take place, to a lesser extent if the drive shaft 26 is accelerated prior to its having come to a complete stop. In this instance the action of the pin 15 will only serve to offset the braking action caused during deceleration by the pin 14.

As should now be apparent, the above described friction brake is completely automatic and self-energizing, and no application of any external force is required for its operation. It works equally as well regardless of the direction in which the shaft is rotating. Among the many uses to which this device may be put are automotive brakes, production machinery and any other installations in which it may be desirable to shorten the period of coast of rotating machinery after power has been cut off.

It is to be understood that the above described arrangement is merely illustrative of the applications of the principles of the invention. Numerous other arrangements may be devised by those skilled in the art without departing from the spirit and scope of the invention.

What is claimed is:

1. An inertia friction brake comprising a drum, a motor driven shaft journaled in said drum, a disc having a hole therethrough near the periphery thereof to receive a pin upon which said disc is free to swing, said disc having a portion cut away to form an eccentric cam, said cam being symmetrical about a line drawn through said pin and the center of said cam, said disc having a slot cut around the middle portion thereof parallel to the sides of said disc to receive a carrying means including a hub portion for supporting said disc, said hub having means for supporting said pin, a flywheel on a low friction bearing mounted on a shaft portion of said carrying means, said flywheel having a pair of oppositely disposed pins extending into said cut away portion of said disc to contact the said cam on said disc thereby urging said disc into contact with said drum by inertia of said flywheel when said driven shaft decelerates to brake said drive shaft.

2. A device as described in claim 1, said carrying means for supporting said disc comprising a hollow shaft to receive the said motor driven shaft, said hub portion having an upright member perpendicular to the said hollow shaft and fitting in the said slot cut in the said disc, and said means for supporting said pin comprising a hole in said upright portion of said hollow shaft to receive the pin on which said disc is free to swing.

References Cited in the file of this patent

UNITED STATES PATENTS

| 1,447,390 | Kucharski | Mar. 6, 1923 |
| 2,175,897 | Johnson | Oct. 10, 1939 |
| 2,708,555 | Heinemann et al. | May 17, 1955 |
| 2,737,277 | Kemna et al. | Mar. 6, 1956 |
| 2,793,715 | Fielder et al. | May 28, 1957 |
| 2,840,715 | Lucien | June 24, 1958 |
| 2,934,616 | Yarber | Apr. 26, 1960 |

FOREIGN PATENTS

| 86,614 | Sweden | June 26, 1919 |